United States Patent
Svarcas et al.

(10) Patent No.: US 7,363,537 B1
(45) Date of Patent: Apr. 22, 2008

(54) SYSTEM AND METHOD FOR FAULT-TOLERANT SYNCHRONIZATION OF REPLICA UPDATES FOR FIXED PERSISTENT CONSISTENCY POINT IMAGE CONSUMPTION

(75) Inventors: Rimas Svarcas, Sunnyvale, CA (US); Stephen L. Manley, Pleasanton, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

(21) Appl. No.: 11/639,929

(22) Filed: Dec. 15, 2006

Related U.S. Application Data

(63) Continuation of application No. 10/777,980, filed on Feb. 12, 2004, now Pat. No. 7,162,662.

(60) Provisional application No. 60/531,851, filed on Dec. 23, 2003.

(51) Int. Cl.
*G06F 11/00* (2006.01)
(52) U.S. Cl. .......................................... 714/15; 714/20
(58) Field of Classification Search .................. 714/15, 714/19, 20, 21
See application file for complete search history.

(56) References Cited

U.S. PATENT DOCUMENTS

| | | | | |
|---|---|---|---|---|
| 5,151,987 | A * | 9/1992 | Abraham et al. .............. 714/20 |
| 5,819,292 | A * | 10/1998 | Hitz et al. ................... 707/203 |
| 5,963,962 | A | 10/1999 | Hitz et al. |
| 6,038,570 | A | 3/2000 | Hitz et al. |
| 6,496,944 | B1 * | 12/2002 | Hsiao et al. .................. 714/15 |
| 6,543,006 | B1 * | 4/2003 | Zundel et al. ................ 714/19 |
| 6,771,843 | B1 * | 8/2004 | Huber et al. ................ 382/305 |
| 6,895,413 | B2 * | 5/2005 | Edwards ..................... 707/201 |
| 6,957,362 | B2 * | 10/2005 | Armangau ................... 714/20 |
| 6,993,539 | B2 * | 1/2006 | Federwisch et al. ......... 707/201 |
| 7,007,046 | B2 * | 2/2006 | Manley et al. .............. 707/204 |
| 7,010,553 | B2 * | 3/2006 | Chen et al. .................. 707/203 |
| 7,039,663 | B1 * | 5/2006 | Federwisch et al. ......... 707/205 |
| 7,043,485 | B2 * | 5/2006 | Manley et al. .............. 707/100 |
| 7,065,540 | B2 * | 6/2006 | Chandrasekaran et al. .. 707/203 |
| 7,103,796 | B1 * | 9/2006 | Kekre et al. ................... 714/6 |
| 7,107,385 | B2 | 9/2006 | Rajan et al. |

(Continued)

OTHER PUBLICATIONS

R. Fielding et al. "Hypertext Transfer Protocol-HTTP/1.1", Request for Comments 2616, Jun. 1999.

(Continued)

*Primary Examiner*—Gabriel Chu
(74) *Attorney, Agent, or Firm*—Cesari and McKenna LLP

(57) ABSTRACT

A method and apparatus for operating a storage system is disclosed. A root node has a first pointers to a plurality of lower nodes, the lower nodes having reference through a plurality of second pointers to point to blocks of persistent storage, the blocks of persistent storage storing data of the storage system. A persistent consistency point of the storage system is created at a selected time, the persistent consistency point created by creating a partial consistency point for one or more of the first pointers and second pointers to selected blocks of data. A statutes indicator is set to indicate that an identified partial consistency point is completed. All partial consistency points are coalesced into a final completed consistency point for the selected time after all of the partial consistency points reach a status of completed.

36 Claims, 9 Drawing Sheets

U.S. PATENT DOCUMENTS

| | | | |
|---|---|---|---|
| 2002/0083037 A1 | 6/2002 | Lewis et al. | |
| 2002/0194529 A1* | 12/2002 | Doucette et al. | 714/6 |
| 2003/0088807 A1* | 5/2003 | Mathiske et al. | 714/6 |
| 2003/0182301 A1* | 9/2003 | Patterson et al. | 707/102 |
| 2003/0182312 A1* | 9/2003 | Chen et al. | 707/200 |
| 2003/0182313 A1* | 9/2003 | Federwisch et al. | 707/200 |
| 2003/0182322 A1* | 9/2003 | Manley et al. | 707/201 |
| 2003/0182325 A1* | 9/2003 | Manley et al. | 707/204 |
| 2003/0182330 A1* | 9/2003 | Manley et al. | 707/205 |
| 2003/0182389 A1* | 9/2003 | Edwards | 709/213 |
| 2003/0195903 A1* | 10/2003 | Manley et al. | 707/201 |
| 2005/0097260 A1* | 5/2005 | McGovern et al. | 711/100 |
| 2006/0179261 A1* | 8/2006 | Rajan | 711/162 |

OTHER PUBLICATIONS

Common Internet File System (CIFS), Version: CIFS-Spec 0.9, Storage Networking Industry Association (SNIA), Draft SNIA CIFS Work Group Work-In-Progress, Revision Date: Mar. 26, 2001.

David Hitz et al. "TR3002 Fily System Design for an NFS File Server Appliance", http://www.netapp.com/tech_library/3002. unknown date.

* cited by examiner

SYSTEM AND METHOD FOR FAULT-TOLERANT SYNCHRONIZATION OF REPLICA UPDATES FOR FIXED PERSISTENT CONSISTENCY POINT IMAGE CONSUMPTION

RELATED APPLICATIONS

The present application is a continuation of U.S. patent application Ser. No. 10/777,980, which was filed on Feb. 12, 2004 now U.S. Pat. No. 7,162,662, by Rimas Svarcas and Stephen L. Manley, for a SYSTEM AND METHOD FOR FAULT-TOLERANT SYNCHRONIZATION OF REPLICA UPDATES FOR FIXED PERSISTENT CONSISTENCY POINT IMAGE CONSUMPTION, which claims the benefit of U.S. Provisional Application Ser. No. 60/531,851, filed Dec. 23, 2003, entitled SYSTEM AND METHOD FOR COALESCING CONSISTENCY POINT IMAGES FOR GUARANTEED CONSUMPTION, by Stephen L. Manley, et al., the teachings of which are hereby incorporated by reference.

This application is related to the following U.S. patent applications:

Ser. No. 10/101,901, entitled SYSTEM AND METHOD FOR MANAGING A PLURALITY OF SNAPSHOTS, by Hugo Patterson, et al., now published as U.S. Publication No. US2003-0182301 on Sep. 25, 2003, the teachings of which are expressly incorporated herein by reference;

Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., now published as U.S. Publication No. US2003-0182325 on Sep. 25, 2003, the teachings of which are expressly incorporated herein by reference;

Ser. No. 10/100,945, entitled SYSTEM AND METHOD FOR STORAGE OF SNAPSHOT METADATA IN A REMOTE FILE, by Stephen L. Manley, et al., now issued as U.S. Pat. No. 7,043,485, on May 9, 2006, the teachings of which are expressly incorporated herein by reference;

Ser. No. 10/100,434, entitled SYSTEM AND METHOD FOR REDIRECTING ACCESS TO A REMOTE MIRRORED SNAPSHOT, by Raymond C. Chen, et al., now issued as U.S. Pat. No. 7,010,553 on Mar. 7, 2006, the teachings of which are expressly incorporated herein by reference;

Ser. No. 10/100,879, entitled FORMAT FOR TRANSMISSION OF FILE SYSTEM INFORMATION BETWEEN A SOURCE AND A DESTINATION, by Stephen L. Manley, et al., now issued as U.S. Pat. No. 7,007,046 on Feb. 28, 2006, the teachings of which are expressly incorporated herein by reference; and Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now issued as U.S. Pat. No. 6,993,539 on Jan. 31, 2006, the teachings of which are expressly incorporated herein by reference.

FIELD OF THE INVENTION

This invention relates asynchronous mirroring or replication of data, and more particularly to the creation of images of the data at times that optimize consumption of image-creation and storage resources.

BACKGROUND OF THE INVENTION

A storage appliance is a computer that provides file service relating to the organization of information on storage devices, such as disks. The file server (or filer) includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a storage appliance, implement file system semantics, such as the Data ONTAP™ storage operating system that is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Inexpensive Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The mirror is updated at regular intervals, typically set by an administrator, in an effort to catch the most recent changes to the file system. One common form of update involves the use of a Snapshot™ process.

Snapshotting is further described in *TR3002 File System Design for an NFS File Server Appliance* by David Hitz et al., published by Network Appliance, Inc., and in U.S. Pat. No. 5,819,292 METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference. The term "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. Note that the terms "PCPI" and "Snapshot™" may be used interchangeably throughout this patent without derogation of Network Appliance's trademark rights.

By way of background, a snapshot or PCPI is a restorable version of a file system created at a specific point in time. PCPIs are generally created on some regular schedule. The PCPI is stored on-disk along with the active file system, and is called into the buffer cache of the storage appliance memory as requested by the storage operating system. An exemplary file system data identifier buffer tree structure (using inodes in this example—but other forms of block and data identifiers can be employed) 100 is shown in FIG. 1. Over the exemplary tree structure may reside a file system information block (not shown). The root inode 105 contains information describing the inode file associated with a given file system. In this exemplary file system inode structure root inode 105 contains a pointer to the inode file indirect block 110. The inode file indirect block 110 contains a set of pointers to inode file and data blocks 115. The inode file data block 115 includes pointers to file and data blocks to 120A, 120B and 120C. Each of the file data blocks 120(A-C) is capable of storing, in the illustrative embodiment, 4 kilobytes (KB) of data. Note that this structure 100 is simplified, and that additional layers of data identifiers can be provided in the buffer tree between the data blocks and the root inode as appropriate.

When the file system generates a PCPI of a given file system, a PCPI inode 205 is generated as shown in FIG. 2. The PCPI inode 205 is, in essence, a duplicate copy of the root inode 105 of the data structure (file system) 100. Thus, the exemplary structure 200 includes the same inode file indirect block 110, inode file data block(s) 115 and file data blocks 120A-C as in FIG. 1. When a user modifies a file data block, the file system layer writes the new data block to disk and changes the active file system to point to the newly created block.

FIG. 3 shows an exemplary data structure 300 after a file data block has been modified. In this illustrative example, file data block 120C was modified to file data block 120C'. When file data block 120C is modified file data block 120C', the contents of the modified file data block are written to a new location on disk as a function for the exemplary file system. Because of this new location, the inode file data block 315 pointing to the revised file data block 120C must be modified to reflect the new location of the file data block 120C. Similarly, the inode file indirect block 310 must be rewritten to point to the newly revised inode file and data block. Thus, after a file data block has been modified the PCPI inode 205 contains a point to the original inode file system indirect block 110 which in turn contains a link to the inode file data block 115. This inode file data block 115 contains pointers to the original file data blocks 120A, 120B and 120C. However, the newly written inode file data block 315 includes pointers to unmodified file data blocks 120A and 120B. The inode file data block 315 also contains a pointer to the modified file data block 120C' representing the new arrangement of the active file system. A new file system root inode 305 is established representing the new structure 300. Note that metadata (not shown) stored in any Snapshotted blocks (e.g., 205, 110, and 120C) protects these blocks from being recycled or overwritten until they are released from all PCPIs. Thus, while the active file system root inode 305 points to new blocks 310, 315 and 120C', the old blocks 205, 110, 115 and 120C are retained until the PCPI is fully released.

After a PCPI has been created and file data blocks modified, the file system layer can reconstruct or "restore" the file system inode structure as it existed at the time of the snapshot by accessing the PCPI inode. By following the pointers contained in the PCPI inode 205 through the inode file indirect block 110 and inode file data block 115 to the unmodified file data blocks 120A-C, the file system layer can reconstruct the file system as it existed at the time of creation of the snapshot.

In mirroring, the above-described PCPI is transmitted as a whole, over a network (such as the well-known Internet) to the remote storage site. Generally, a PCPI is an image (typically read-only) of a file system at a point in time, which is stored on the same primary storage device as is the active file system and is accessible by users of the active file system. Note, that by "active file system" it is meant the file system to which current input/output (I/O) operations are being directed. The primary storage device, e.g., a set of disks, stores the active file system, while a secondary storage, e.g. a tape drive, may be utilized to store backups of the active file system. Once Snapshotted, the active file system is reestablished, leaving the imaged version in place for possible disaster recovery. Each time a PCPI occurs, the old active file system becomes the new PCPI, and the new active file system carries on, recording any new changes. A set number of PCPIs may be retained depending upon various time-based and other criteria. The PCPI process is described in further detail in U.S. patent application Ser. No. 09/932,578, entitled INSTANT SNAPSHOT by Blake Lewis et al., now published as U.S. Publication No. US2002-0083037 on Jun. 27, 2002, which is hereby incorporated by reference as though fully set forth herein.

In some circumstances it may be desirable to replicate less than an entire volume structure. The volume-based approach typically forces an entire volume to be scanned for changes and those changes to be transmitted on a block-by-block basis. In other words, the scan focuses on blocks without regard to any underlying information about the files, modes and data structures, which the blocks comprise. The destination is organized as a set of volumes so a direct volume-by-volume mapping is established between source and destination. Where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups such as qtrees, because some groups are more likely to undergo frequent changes, it may be desirable to update their PCPIs/Snapshots™ more often than other, less-frequently changed groups. In addition, it may be desirable to mingle original and imaged (Snapshotted) sub-groups in a single volume and migrate certain key data to remote locations without migrating an entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for replicated data may be desirable. An approach to remote asynchronous mirroring of a qtree is described in U.S. patent application Ser. No. 10/100,967 entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now issued as U.S. Pat. No. 6,993,539 on Jan. 31, 2006, the teachings of which are incorporated herein by reference.

In an exemplary implementation of a qtree mirroring application, as described in the above-referenced patent application, a pair of PCPIs (Snapshots™) are taken on a given source system at discrete points in time. They are compared to determine changes in the block structure. These changes are gathered and transmitted asynchronously over a network to a destination system for storage in a replica qtree. The storage and update of the replica qtree consumes a number of PCPIs on the destination side as well. The exemplary implementation may support as many as 255 active qtrees on a volume (comporting with current bit limitations in the NFS filehandle structure). However, there may only be provisions for 255 PCPIs. It is, therefore possible for the number of needed PCPIs to equal or exceed the maximum available number under certain circumstances—for example where a large number of qtrees have mirror relationships involving the update and transfer of changes to the destination. While it may be possible to arbitrarily increase the number of available active PCPIs on the system, this may also create substantially increased overhead that can severely tax the system's processing and memory resources and associated processing speed.

SUMMARY OF THE INVENTION

The disadvantages of the prior art are overcome by recognizing that PCPIs capture an image of the entire active file system at a specific point in time. Hence, it is possible to synchronize a plurality of concurrent replica updates of a storage system so that PCPI resources on the system are consumed at a fixed level. In other words, a single PCPI is shared (coalesced) between a number of updating qtrees or other organizational structures. By the novel coalescing technique, PCPIs are consumed at a fixed level regardless of the number of qtrees that are coalesced onto a single volume. Illustratively, four PCPIs are consumed for use in a coalescing cycle. In other words, a management agent creates a common, shared persistent consistency point image (PCPI) across all organizational structures at the time when the slowest organizational structure completes. In this manner the completion of an update of quicker qtrees is carried out concurrently with the completion of the update of the slowest coalesced qtree. In order to enable coalescing of a number of updating qtrees/organizational structures into a single PCPI, the update process is divided into a series of states that enable tracking and management of success or failure of the process at various critical points.

In the illustrative embodiment, a management agent moves the qtrees through a series of states and tracks the state of each qtree. The tracking involves establishment of a stable state at which time the active file system fully matches the prevailing destination replica/mirror. This proceeds to an update stage that, if successful, precipitates a done state in which a PCPI of all qtrees is taken and the update exported from the destination. The done state represents a state that exists after the source has completed sending all data and the destination is committed to completing the transfer. If the update fails, then the qtree transitions to an unstable rollback state, from which a rollback to an earlier version (previous PCPI) of the active file system is attempted. If that rollback succeeds, then the done state is again achieved. From the done state, the cycle completes when the management agent performs a two-step jump-ahead and generates a new coalesced PCPI incorporating all stable qtrees.

In certain extreme situations, a rollback procedure will fail, typically due to a software bug or resource problem. The present invention will recover once the underlying error condition is removed. In these extreme cases where a rollback is unsuccessful, then a unstable uncoalesced state is entered by those qtrees that remain unstable. A rollback, which is eventually successful leads to a stable uncoalesced state. Such qtrees and those that have entered the done state, along with those qtrees that remained in the stable state, are subjected to a two-step jump-ahead procedure by the management agent in which the active file system is made coherent and the stable state is again achieved. During this two-step jump-ahead procedure, the management agent generates a new coalesced PCPI that includes all stable qtrees.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Source and Destination Storage System Environment

Figure 7:
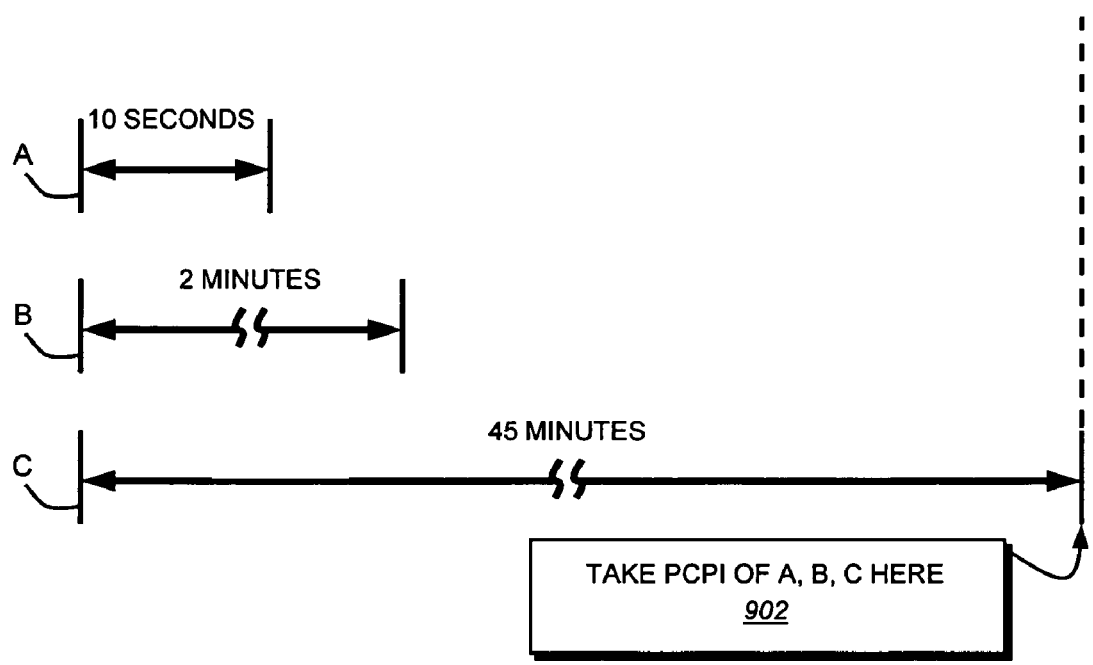
FIG. 7 is a timing diagram showing three exemplary qtrees and their respective update intervals, with a single PCPI being taken at the end of the longest interval in accordance with an illustrative embodiment of the present invention.

By way of further background, FIG. 7 is a schematic block diagram of a storage system environment 600 that includes a pair of interconnected storage systems (e.g. file servers, computers, networked storage devices) and the like including a source system 610 and a destination system 612 that may be advantageously used with the present invention. For the purposes of this description, the source system is a networked computer that manages storage one or more storage disks 660. The source system 610 executes an operating system 611. The operating system 611 may be a filer implementing the Data Ontap™ storage operating system as described above or alternatively another operating system such as the commercially available Sun Microsystems's Solaris®, Microsoft Windows® 2000, HP/UX or AIX. The operating system 611 implements an OS-specific file system (such as the above-described WAFL file system) on the disks 660 connected to the source system 610.

The destination system, in this example is a file server or filer 612 that manages one or more destination volumes 616, comprising arrays of disks 660. The source 610 and destination 612 are linked via a network 618 that can comprise a local or wide area network, such as the well-known Internet. An appropriate network adapter 638 and 630, residing the source and destination 610, and 612 respectively, facilitates communication over the network 618. Note, as used herein, the term "source" can be broadly defined as a location from which the subject data of this invention travels and the term "destination" can be defined as the location to which the data travels. While a source and a destination, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same filer.

The destination filer 612 comprises a processor 620, a memory 625, a network adapter 630 and a storage adapter 640 interconnected by a system bus 645. The destination filer 612 also includes a storage operating system 700 (FIG. 5) that implements a file system to logically organize the information as a hierarchical structure of directories and files on the disks. As noted above, the source system 610 can also be described in connection to the storage operating system 700 in an illustrative embodiment.

It will be understood to those skilled in the art that the inventive technique described herein may apply to any type of special-purpose computer (e.g., file serving appliance) or general-purpose computer, including a standalone computer, embodied as a storage system. To that end, the destination filer 612 can be broadly, and alternatively, referred to as a "storage system." Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the destination memory 625 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 700, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 630 comprises the mechanical, electrical and signaling circuitry needed to connect the filer 612 to the network 618, which may comprise a point-to-point connection or a shared medium, such as a local area network. Moreover the source 610 may interact with the destination filer 612 in accordance with a client/server model of information delivery. That is, the client may request the services of the filer, and the filer may return the results of the services requested by the client, by exchanging packets encapsulating, e.g., the TCP/IP protocol or another network protocol format over the network 618.

The storage adapter 640 cooperates with the operating system 700 (FIG. 5) executing on the filer to access information requested by the client. The information may be stored on the disks 660 that are attached, via the storage adapter 640 to the filer 612 or other node of a storage system as defined herein. The storage adapter 640 includes input/output (I/O) interface circuitry that couples to the disks over an I/O interconnect arrangement, such as a conventional high-performance, Fibre Channel serial link topology.

Each system 610, 612 may also be interconnected with one or more clients (not shown) via the network adapters 636, 630, respectively. The clients transmit requests for file service to the destination filer 612 respectively, and receive responses to the requests over a LAN or other network (618). Data is transferred between the client and the filer 612 using data packets defined as an encapsulation of the Common Internet File System (CIFS) protocol or another appropriate protocol, such as NFS.

In one exemplary filer implementation, the destination filer 612 can include non-volatile random access memory (NVRAM) 635 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 660 are arranged into a plurality of volumes (for example, source volumes 614 and destination volumes 616), in which each volume has a file system associated therewith. The volumes each include one or more disks 660. In one embodiment, the physical disks 660 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume. Information in the volumes may be organized as files, directories and virtual disks (vdisks). That is, to facilitate access to the disks, the destination storage operating system 700 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage area network (SAN) client, which may implement a block-based protocol for storage organization. Each "on-disk" file may be implemented as set of disk blocks configured to store information, such as data, whereas the directory may be implemented as a specially formatted file in which names and links to other files and directories are stored. Vdisks are further described in U.S. patent application Ser. No. 10/216,453, entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 12, 2006, the teachings of which are hereby incorporated by reference. As will be made more clear with reference to the storage operating system 700 below, the exemplary destination filer 700 may be characterized more particularly as a multi-protocol storage appliance, capable of receiving storage requests according to a plurality of protocols and performing storage service operations according to either a file-based or block-based organization.

In the illustrative embodiment, a source qtree is mirrored to a destination qtree using a qtree-based mirroring technique, such as that described in the above-incorporated patent application entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al, now published as U.S. Publication No. US2003-0182301 on Sep. 25, 2003. However, it should be noted that the technique of the present invention may be utilized with any acceptable mirroring technique that may be suitably modified to utilize the teachings of the present invention. To facilitate the transfer of replica data from the source 610 to the destination 612 via the network 618, a formatted data stream 690 is employed. While it is contemplated that a variety of data transmission schemes and formats can be employed according to various alternate embodiments of this invention, and exemplary data format and related concepts are described in commonly owned U.S. patent application Ser. No. 10/777,887, entitled SYSTEM-INDEPENDENT DATA FORMAT IN A MIRRORED STORAGE SYSTEM ENVIRONMENT AND METHOD FOR USING THE SAME, by Stephen L. Manley, the teachings of which are expressly incorporated herein by reference.

B. Storage Operating System

In the illustrative embodiment, the storage operating system resident on the destination filer is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system and/or storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 1:
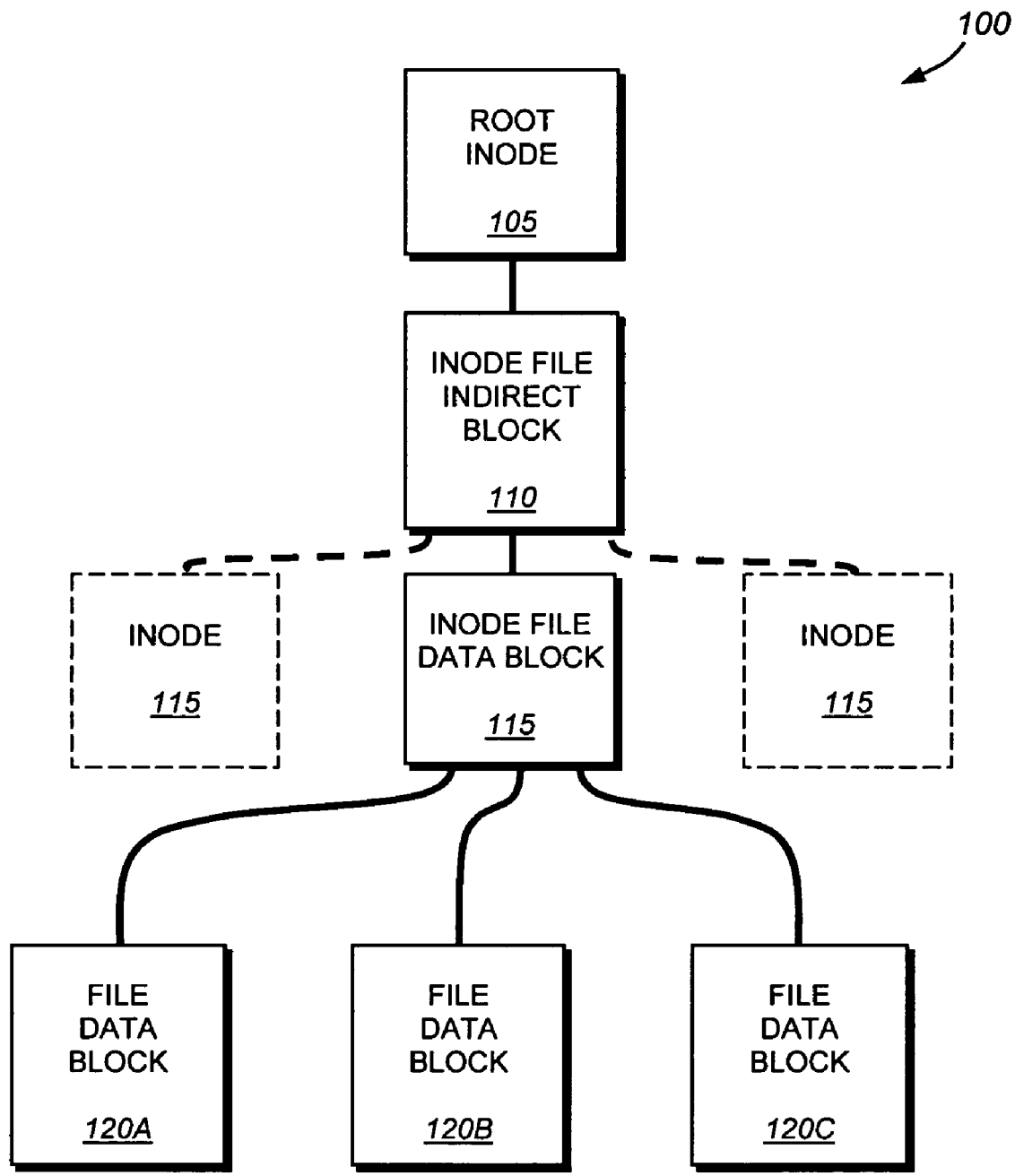
FIG. 1, already described, is schematic block diagram of an exemplary file system inode structure about to undergo a PCPI procedure according to the prior implementation.
Figure 2:
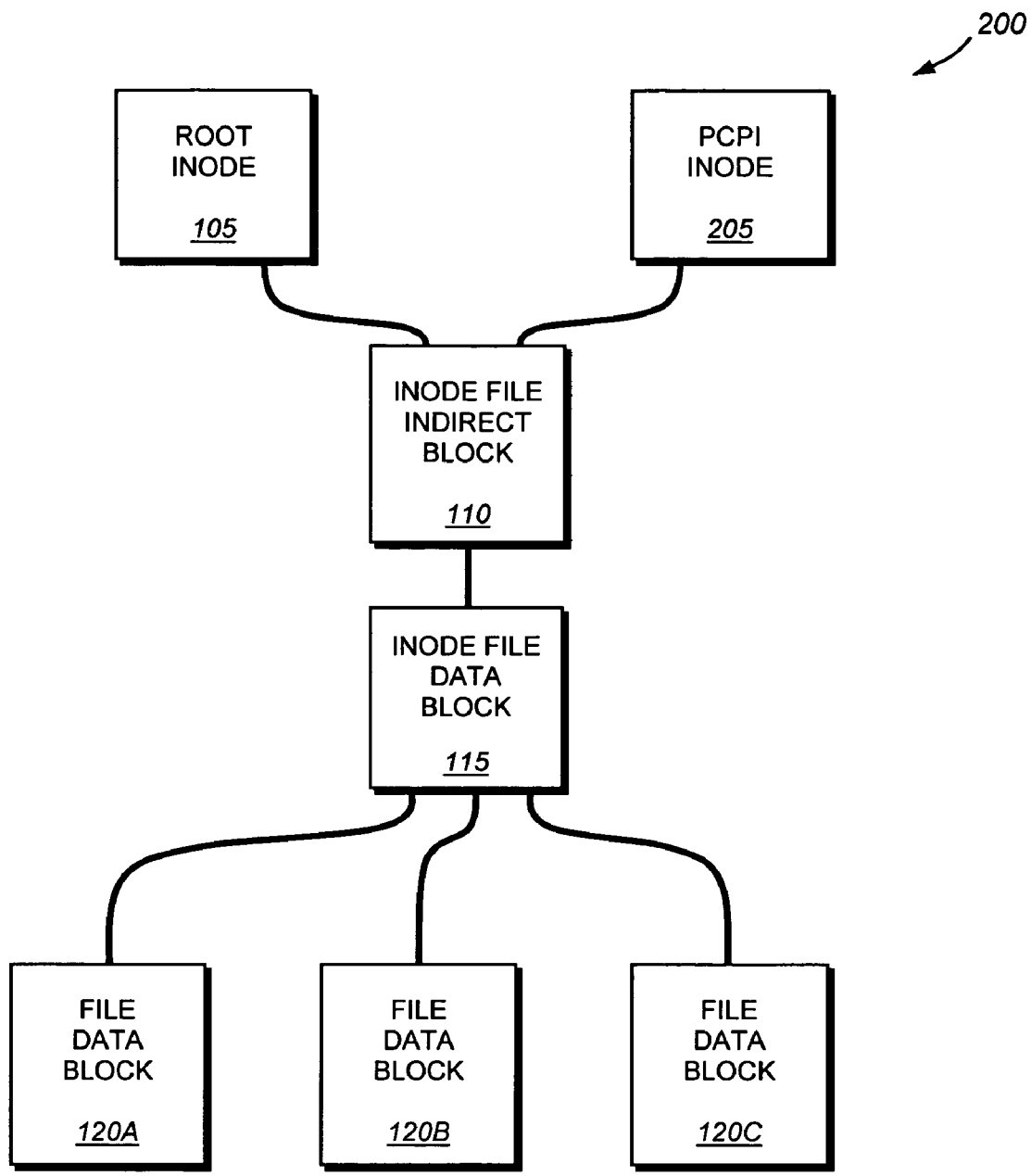
FIG. 2, already described, is a schematic block diagram of the exemplary file system inode structure of FIG. 1 including a PCPI inode, according to a prior implementation.
Figure 3:
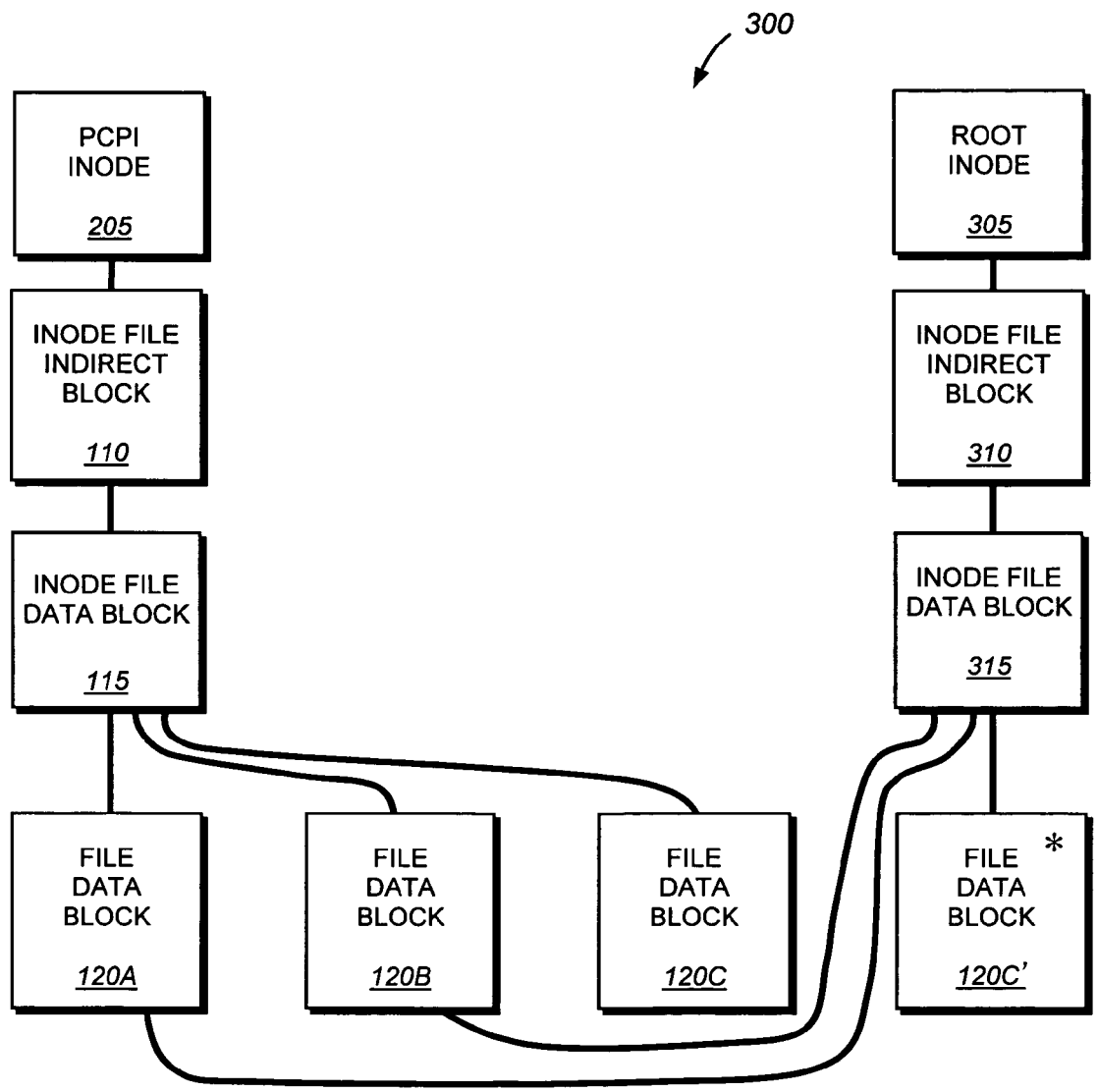
FIG. 3, already described, is a schematic block diagram of an exemplary file system inode structure of FIG. 1 after data block has been rewritten, according to a prior implementation.
Figure 4:
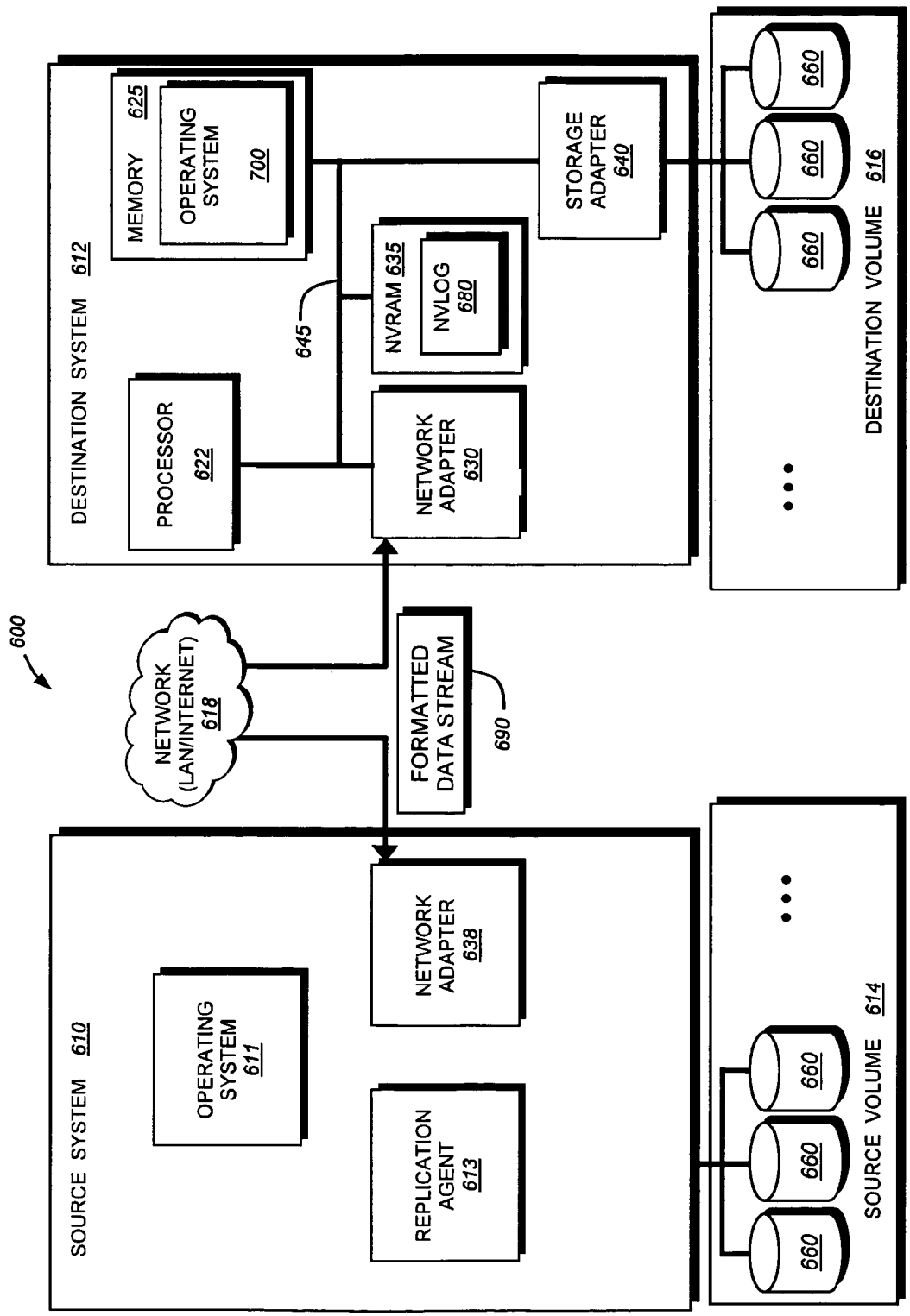
FIG. 4 is a schematic block diagram of an exemplary source storage system and destination storage system interconnected by a network and transmitting a formatted data stream in accordance with an illustrative embodiment of this invention.
Figure 5:
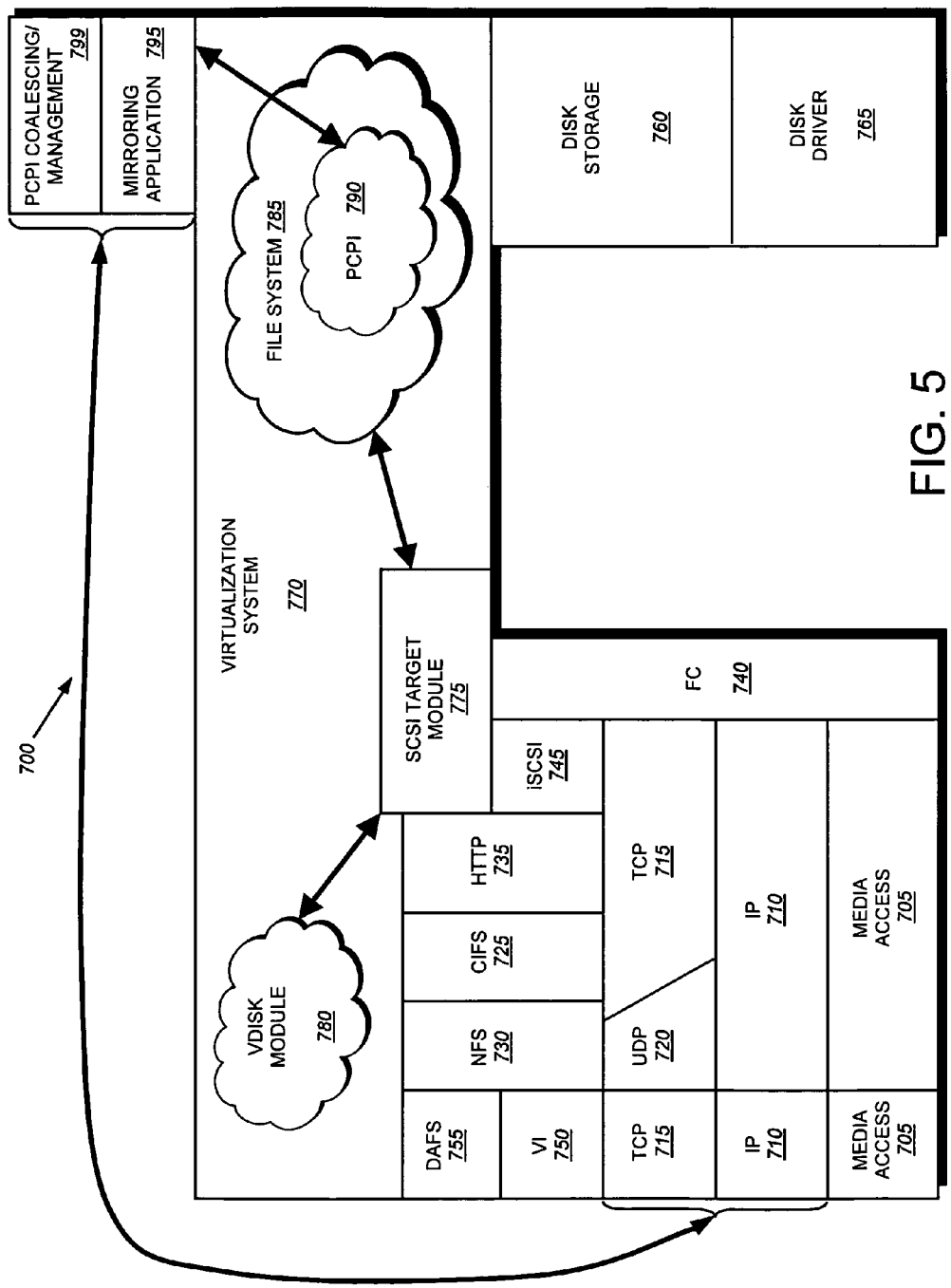
FIG. 5 an exemplary storage operating system running on the destination storage system in accordance with an embodiment of the present invention.

FIG. 5 is a schematic block diagram of an illustrative storage operating system 700 that may be advantageously used with the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 705 of network drivers (e.g., gigabit Ethernet drivers) that interfaces to network protocol layers, such as the IP layer 710 and its supporting transport mechanisms, the TCP layer 715 and the User Datagram Protocol (UDP) layer 720. A file system protocol layer provides multi-protocol file access and, to that end, includes support for the DAFS protocol 755, the NFS protocol 730, the CIFS protocol 725 and the Hypertext Transfer Protocol (HTTP) protocol 735. A VI layer 750 implements the VI architecture to provide direct access transport (DAT) capabilities, such as remote direct memory access (RDMA), as required by the DAFS protocol 755.

An iSCSI driver layer 745 provides block protocol access over the TCP/IP network protocol layers, while a FC driver layer 740 operates with a Fibre Channel adapter in the filer 612 to receive and transmit block access requests and responses to and from the integrated storage appliance. The FC and ISCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 760 that implements a disk storage protocol, such as a RAID protocol, and a disk driver layer 765 that implements a disk access protocol such as, e.g., a SCSI protocol.

Bridging the disk software layers with the integrated network protocol stack layers is a virtualization system 770 that is implemented by a file system 785 interacting with virtualization modules illustratively embodied as, e.g., vdisk module 780 and SCSI target module 775. It should be noted that the vdisk module 780, the file system and SCSI target module 775 can be implemented in software, hardware, firmware, or a combination thereof. The vdisk module 780 interacts with the file system 785 to enable access by administrative interfaces in response to a system administrator issuing commands to the filer 612 in its arrangement as a multi-protocol storage appliance. In essence, the vdisk module 780 manages SAN deployments by, among other things, implementing a comprehensive set of vdisk (lun) commands issued through a user interface by a system administrator. These vdisk commands are converted to primitive file system operations ("primitives") that interact with the file system 785 and the SCSI target module 775 to implement the vdisks.

The SCSI target module 775, in turn, initiates emulation of a disk or lun by providing a mapping procedure that translates luns into the special vdisk file types. The SCSI target module is illustratively disposed between the FC and iSCSI drivers 740, 745 and the file system 785 to thereby provide a translation layer of the virtualization system 770 between the SAN block (lun) space and the file system space, where luns are represented as vdisks.

The file system 785 illustratively implements the WAFL file system having an on-disk format representation that is block-based using, e.g., 4-kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the teachings of which are hereby incorporated by reference.

The storage operating system 700 further includes, in the illustrative embodiment, a mirroring application 795 that performs volume-based, qtree-based, or another sub-volume level mirroring function. The mirroring application 795 is illustratively integrated with the TCP 715 and IP 710 layers and a PCPI processes 790 within the file system 785. The mirroring application 795 utilizes TCP/IP for communication with the upstream and/or downstream within a cascaded chain of storage systems. The mirroring application 795 utilizes the PCPI processes 790 within the file system 785 to determine changed blocks within volumes and/or qtrees.

C. Remote Asynchronous Mirroring

The general principles of remote asynchronous mirroring of a volume or subvolume/qtree data set from a source to a destination are described in detail in the above-incorporated U.S. patent application Ser. No. 10/100,950, entitled SYSTEM AND METHOD FOR ASYNCHRONOUS MIRRORING OF SNAPSHOTS AT A DESTINATION USING A PURGATORY DIRECTORY AND INODE MAPPING by Stephen L. Manley, et al., now published as U.S. Publication No. US2003-0182325 on Sep. 25, 2003, and other related applications incorporated herein above. The illustrative embodiment of the invention employs the techniques described in these above-incorporated patent applications to receive and store, as a replica data set of the source, on the destination side, a data stream generated by the source. The source data may be organized in a variety of manners and appropriate mechanisms on the source side (in its replication agent 613) are used to generate the formatted data stream 690 in accordance with the illustrative embodiment of this invention. In one embodiment, both the source system and the destination system include respective pipelines (described further below) for generating and decoding the formatted data stream.

Figure 6:
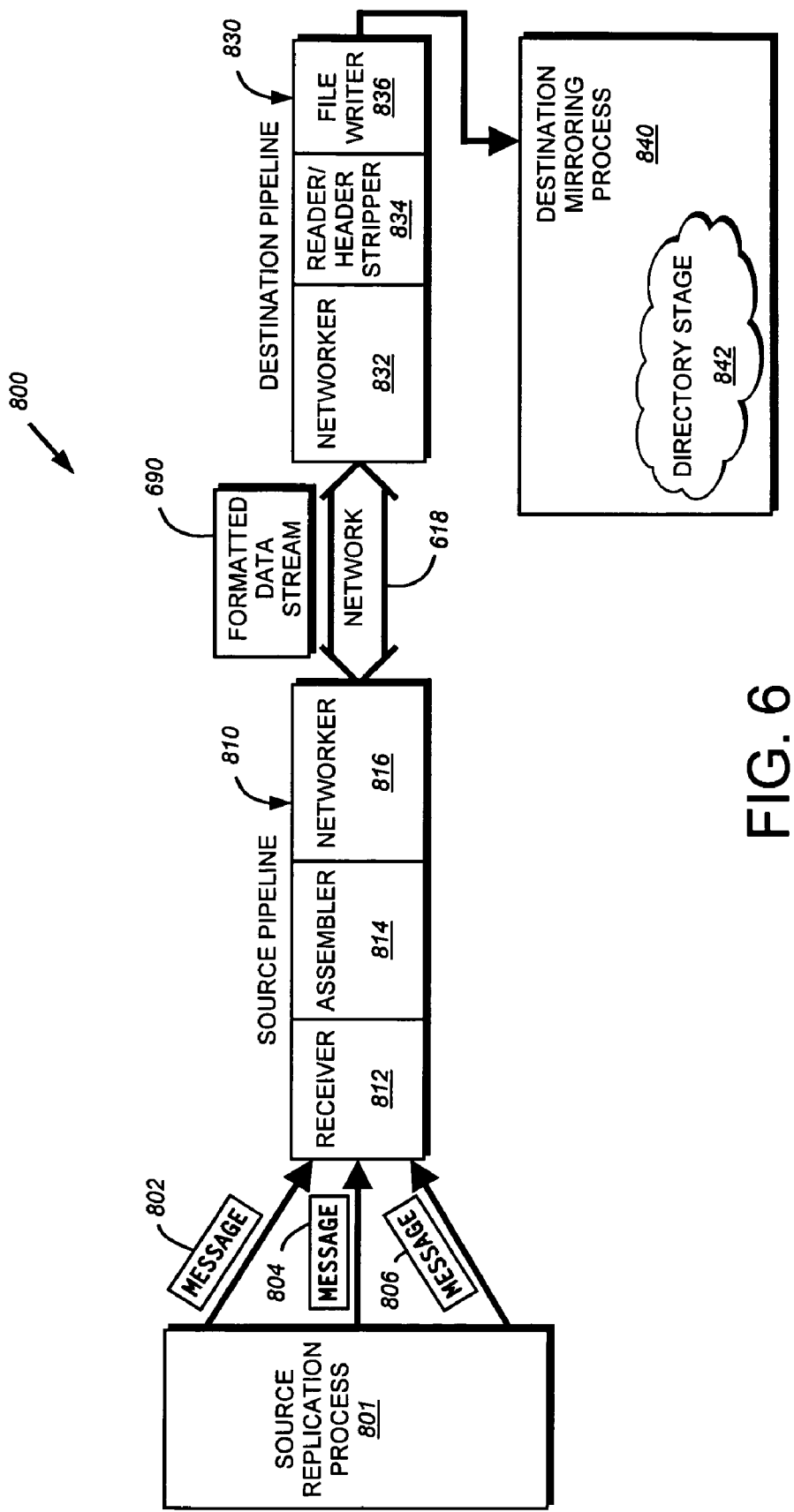
FIG. 6 is a schematic block diagram of a transmission scheme for data across a network between a source storage system and a destination storage system.

With further reference to FIG. 6, the transmission of data to be backed up from the source system to the destination replica is described in an overview 800. This data transmission is further described in the above-incorporated patent application entitled SYSTEM AND METHOD FOR ASYNCHRONOUS MIRRORING OF SNAPSHOTS AT A DESTINATION USING A PURGATORY DIRECTORY AND INODE MAPPING. The replication process 801 sends messages 802, 804 and 806 containing the change information to a source pipeline 810. Note that this pipeline is only an example of a mechanism to implement a mechanism for packaging file system data into the formatted data stream 690 and sending that stream to a network layer. The messages are routed first to a receiver 812 that collects the messages and sends them on to an assembler 814 as a group comprising the snapshot change information to be transmitted over the network 618. Again, the "network" as described herein should be taken broadly to include anything that facilitates transmission of volume sub-organization (e.g. qtree) change data from a source sub-organization to a destination sub-organization, even where source and destination are on the same file server, volume or, indeed (in the case of rollback as described in the above-incorporated U.S. patent application entitled SYSTEM AND METHOD FOR ASYNCHRONOUS MIRRORING OF SNAPSHOTS AT A DESTINATION USING A PURGATORY DIRECTORY AND INODE MAPPING) are the same sub-organization at different points in time. An example of a "network" used as a path back to the same volume is a loopback. The assembler 814 generates the specialized format 690 described in detail below for transmitting the data stream of information over the network 618 that is predictable and understood by the destination. The networker 816 takes the assembled data stream and forwards it to a networking layer. This format is typically encapsulated within a reliable networking protocol such as TCP/IP. Encapsulation can be performed by the networking layer, which constructs, for example, TCP/IP packets of the formatted replication data stream.

As changed information is forwarded over the network, it is received at the destination pipeline piece 830. This pipeline also includes a networker 832 to read out TCP/IP packets from the network into the snapshot replication data stream format 690 encapsulated in TCP/IP. A data reader and header stripper 834 recognizes and responds to the incoming format 690 by acting upon information contained in various format headers (described below). A writer 836 is responsible for placing data derived from the format into appropriate locations on the destination file system. The storage and handling of backup data are implemented by the destination mirroring process 840. Various embodiments of this process is described in detail in the above-incorporated SYSTEM AND METHOD FOR ASYNCHRONOUS MIRRORING OF SNAPSHOTS AT A DESTINATION USING A PURGATORY DIRECTORY AND INODE MAPPING and related applications thereto. Briefly, according to one example, the destination pipeline 830 forwards data and directory information to the main destination mirror process 840. The exemplary destination mirror process 840 consists of a directory stage 842, which builds the new replicated file system directory hierarchy on the destination side based upon the received changes in a PCPI on the source. To briefly summarize, the directory stage creates, removes and moves files based upon the received formatted information. A map of modes from the destination to the source is generated and updated. In this manner, inode numbers on the source file system are associated with corresponding (but typically different) inode numbers on the destination file system. Notably, a temporary or "purgatory" directory is established to retain any modified or deleted directory entries until these entries are reused by or removed from the replicated snapshot at the appropriate directory rebuilding stage within the directory stage. In addition, a file stage of the destination mirror process populates the established files in the directory stage with data based upon information stripped from associated format headers.

D. Coalescing of PCPIs for Fixed Resource Consumption

FIG. 7 shows three exemplary qtrees (or any other organizational structure that can be replicated using a PCPI-based mirroring technique, including, but not limited to volumes, sub-volumes, aggregates, etc.), each of which can be included in a PCPI so as to produce a replica or mirror on a destination backing store. These qtrees, and their associated update processes are termed A, B and C. These update processes involve the transmission of updated qtree data from the source over a network or other pathway to the destination replica/mirror. As noted above, the update process runs for a certain length of time that is often directly related to the size of the qtree and/or the amount of incremental changes to be transmitted to the replica.

Administrators typically locate qtrees with similar update times on a single volume so that, when a PCPI is generated, the PCPI will not contain out of date images of a qtree. However, for a variety of reasons, any transfer may take significantly more time to update. The novel system and method of the present invention can accommodate such irregularities, such as the example of FIG. 7. In this example, A took ten (10) seconds to update, B took two (2) minutes to update and C took forty-five (45) minutes to update. In other words, even though other qtrees may be able to transmit updates at a more-frequent interval, the user only sees the entire updated file system after the slowest-updating qtree completes its update. Thus, in accordance with an illustrative embodiment, a PCPI is taken (box 902) of all three qtrees A, B and C as a group at the end of the longest update interval (45 minutes for C).

Once a PCPI is taken of the volume, thereby capturing all relevant qtrees, each qtree can export it as the new consistent image of the source file system. It is highly desirable to track the progress of the update and provide mechanisms for recovering in the event of a problem or failure with some aspect of the update. The coalescing of qtree PCPIs as described above is carried out by the mirroring application generally, using a coalescing and management agent 799 (FIG. 7). This agent manages and tracks updates for each of the qtrees and determines when a PCPI is to be taken and which PCPI is to be exported by each destination. This agent is also responsible for tracking states of the update process, which will now be described.

Figure 8:
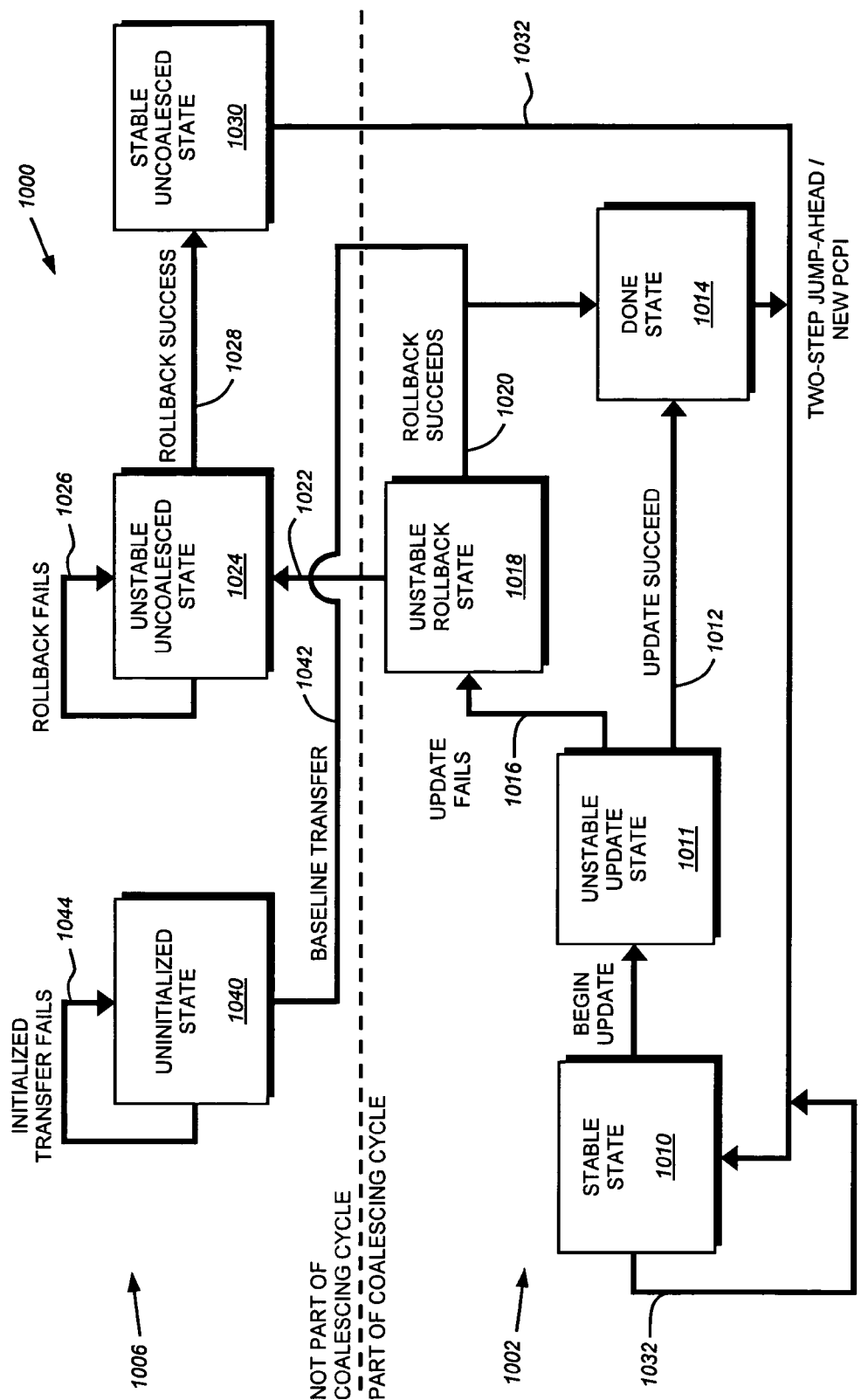
FIG. 8 is a flow diagram of a procedure for tracking and managing the updates of destination replica qtrees of a coalesced set in accordance with an illustrative embodiment of the present invention.

FIG. 8 details a procedure 1000 for tracking qtree updates and the formation of a coalesced PCPI that includes a plurality of individual qtrees. In the illustrative embodiment, all qtrees concurrently move through the various states of the coalescing cycle 1002. The management agent manages and tracks each qtree as it moves through the coalescing cycle. As all qtrees move concurrently through the coalescing cycle, the system consumes PCPIs at a fixed level because all qtrees in the coalescing cycle jump forward (via branch 1032) to a new stable state 1010 where they export a new coalesced base PCPI. In the illustrative embodiment, the novel system and method consumes four PCPIs for use in the coalescing cycle. These four qtrees are a coalesced base PCPI, a coalesced rollback PCPI, an intermediate jump-ahead PCPI and a new coalesced base PCPI. The coalesced base PCPI represents the currently exported coalesced PCPI. The coalesced rollback PCPI is a PCPI generated in the event that any qtree needs to undergo a rollback procedure, described further below. The intermediate jump-ahead PCPI is utilized during the two-step jump-ahead procedure, which results in a new coalesced base PCPI that then becomes the currently exported PCPI.

Some states are part of the ongoing coalescing and PCPI-export process and are depicted in a field 1002 below the dashed line 1004, where qtrees share a fixed number of PCPIs and do not create PCPIs individually. The management agent only consumes PCPIs for events below line 1004. Other states are not considered part of the ongoing coalescing process and appear above the line 1004 in the upper field 1006. States outside of the coalescing cycle 1006 are fault-tolerant additions that typically do not occur. Qtrees that are not using a shared PCPI or are otherwise outside of the standard coalescing cycle have states in this field. This is described in detail further below.

Beginning with the conventional coalescing cycle 1002, all coalesced qtrees begin in a stable state 1010. At this time, the qtrees are exporting the same PCPI in which each qtree matches a source PCPI, which corresponds to a point in time image of the source active file system. Once a qtree begins an update, the qtree moves to an unstable update state 1011. If the update succeeds (branch 1012), then the qtree moves to a done state 1014. In general, the done state 1014 represents a state of the mirror after the source has finished sending all data and the destination is committed to the update. Thus, the done state represents a point where destination-only post-processing is required to make the mirror stable. From the done state 1014, a qtree will be included in the two-step jump ahead branch 1032 at the end of the cycle when all coalesced qtrees transition over 1032 to the stable state 1010 at which time they are exporting the new coalesced baseline PCPI. During this two-step jump ahead procedure, the management agent generates a new PCPI of all coalesced PCPIs.

If the update fails (branch 1016) because, for example, of a network failure or source error, then the qtree moves to the unstable rollback state 1018. In this state it is necessary to perform a rollback operation, which is designed to ensure that all qtrees move from an unstable state to a done state. The rollback operation is necessary to make the qtree stable again, so that the coalescing cycle only consumes the fixed number of PCPIs while exporting a PCPI that contains a stable image of the source active file system from a point in time.

Briefly, a partial incremental transfer can be undone by applying this rollback procedure. In essence, an incremental update process is performed in reverse so as to recover from a failed transfer, and return the active file system to the state of a given PCPI.

Figure 9:
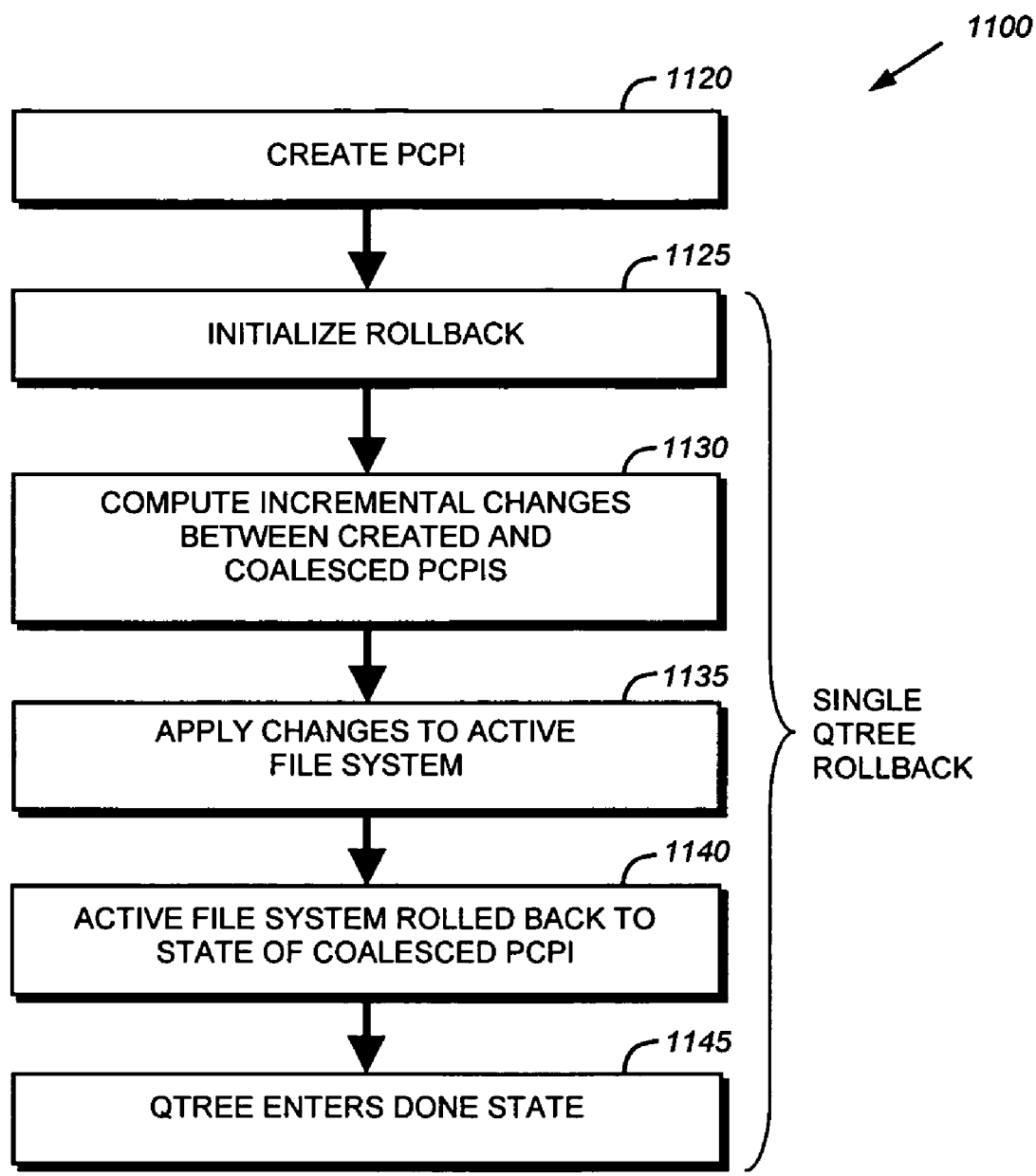
FIG. 9 is a flow diagram of a rollback procedure for use in making stable a partially updated qtree in a set of coalesced qtrees in accordance with an embodiment of the present invention.

Reference is made to FIG. 9, which describes a generalized rollback procedure 1100 according to an illustrative embodiment. The management agent creates a PCPI in step 1120 for use by all qtrees that are unstable. Steps 1125-1145 represent the steps performed on each qtree in performing a single qtree rollback procedure. In step 1125 the rollback operation is initialized.

Next, in step 1130, the incremental changes are computed between the PCPI created by the management agent for use by unstable qtrees and the currently exported coalesced PCPI. The computed incremental changes are then applied to the active file system in step 1135. The changes are applied so that the active file system is eventually "rolled back" to the state contained in the coalesced PCPI (step 1140). This is the active file system state existing before the partial rollback that necessitated the rollback.

If the rollback from the unstable state is successful (branch 1020), then the qtree enters the done state 1014. However, if the rollback is not successful, then the qtree transitions (branch 1022) to the unstable uncoalesced state 1024, while other successfully rolled-back qtrees are directed to the done state 1014 separately. Note that the unstable uncoalesced state is in the field 1006, which is outside the coalescing cycle 1002. In the unstable uncoalesced state, these qtrees will export a series of individual per-qtree PCPIs in order to render them again stable. In the unstable uncoalesced state, an attempt is made, on a per-qtree basis to again roll-back each qtree. A rollback procedure should not fail absent some abnormal problem such as, for example, software bug or a lack of space on disk. Rollbacks will be attempted periodically on each qtree (loop 1026) until success occurs (due to freeing of resources, repair of software bug, etc.). When rollback of the unstable qtrees succeeds (branch 1028), then the qtrees enter the stable uncoalesced state 1030 in which the qtrees are stable. The qtrees in this stable uncoalesced state 1030, the stable state 1010 and the done state, all lead to return branch 1032 of the coalescing cycle at which time the management agent performs a two-step jump ahead process to move all qtrees from the stable uncoalesced state 1030 (if any), the stable state 1010 and the done state 1014 back to the stable state 1010. A qtree may remain in the stable state 1010 because, for example, no update was attempted to them.

Thus, the return to the stable state (branch 1032) involves taking of a PCPI of the qtrees from the done state, the stable state and the stable uncoalesced state (if any). Next the purgatory directories are deleted. One PCPI is then taken of the qtrees and the qtrees from all three states (stable, done and jump-ahead) are moved back into a stable state 1010 in which the active file system matches the replica on the destination. During this transition 1032 the qtrees begin exporting the new coalesced base PCPI at which time all older coalesced PCPIs are no longer necessary.

In the event of a system failure, the on-disk structures retain the current state of each qtree in an associated metadata file (described in the above-incorporated SYSTEM AND METHOD FOR STORAGE OF SNAPSHOT METADATA IN A REMOTE FILE, by Stephen L. Manley, et al., now issued as U.S. Pat. No. 7,043,485 on May 9, 2006). The mirroring application and associated management agent 799 are responsible for storing this information in the metadata file on an ongoing basis as each action or state change occurs. Upon restart or recovery from a failure, the management agent 799 can retrieve the information on each qtree to determine, for example, if it is in a stable or unstable state, part of a coalesced PCPI or represented by an individual PCPI, and other key data. If all qtrees were in the process of completing the cycle, the management agent moves the qtrees through branch 1032 to create a new coalesced base PCPI.

Of course, a baseline transfer to a destination replica/mirror is considered to be outside of the coalescing cycle (field 1006). A read-only uninitialized qtree begins in the uninitialized state 1040. From there, the qtree attempts to enter the coalescing cycle by completing a baseline transfer (branch 1042). If successful, this transitions the qtree to the done state 1014. The qtree is now coalesced, and so at the end of the next coalescing cycle, the management agent performs a two-step jump-ahead on this qtree (branch 1032) along with all other qtrees in the done state 1014, the stable uncoalesced state 1030 and the stable state 1010, thereby transitioning it to the stable state 1010. At this point, the baseline image of the newly initialized qtree is user-visible.

In the event of "broken" qtrees, or qtrees that are otherwise writable and are not exporting a PCPI, an administrator may manually resynchronize the qtree with the coalescing cycle. A qtree to be resycnhronized initially enters in the unstable uncoalesced state 1024 by creating a PCPI and exporting it and proceeds according to the rollback procedure.

The foregoing has been a detailed description of embodiments of the invention. Various modifications and additions can be made without departing from the spirit and scope thereof. For example, while files and directories are denoted herein, the data can be organized around a variety of data structures and the terms "file," "file system," "directory" and the like should be taken broadly to include a variety of "data structures," "data sets," or "data organizations." Likewise, while the disk storage layers utilizes a RAID organization, it is contemplated that a variety of storage arrangements can be employed. Similarly, while the storage devices described herein are disks, the principles of this invention can be applied to a variety of storage devices or media including, but not limited to, electro-optical, solid-state, magnetic, and the like. Finally, it should be understood that any and all of the principles described herein can be implemented as hardware, software that consists of a computer readable medium executing program instructions on a computer, or a combination of hardware and software. Accordingly, this description is meant to be taken only by way of example, and not to otherwise limit the scope of this invention.

What is claimed is:

1. A method for operating a storage system, comprising:
   maintaining a root node having first pointers to a plurality of lower nodes, the lower nodes having reference through a plurality of second pointers to point to blocks of persistent storage, the blocks of persistent storage storing data of the storage system;
   creating a persistent consistency point of the storage system at a selected time, the persistent consistency point created by creating a partial consistency point for one or more of the first pointers and second pointers to selected blocks of data;
   setting a status indicator to indicate that an identified partial consistency point is completed; and
   coalescing all partial consistency points into a final completed consistency point for the selected time after all of the partial consistency points reach a status of completed.
2. The method as in claim 1, further comprising:
   saving the final completed consistency point in persistent storage by an operating system of a computer maintaining the storage system.
3. The method as in claim 1, further comprising:
   transferring data of the final completed consistency point over a computer network to a target computer; and
   saving the final completed consistency point in persistent storage by the target computer.
4. The method as in claim 1, further comprising:
   rolling back a partial consistency point in response to a failure in transferring partial consistency point data to a persistent storage.
5. The method as in claim 1,
   wherein the root node comprises a root inode.
6. The method as in claim 1,
   wherein the lower nodes comprise inodes.
7. The method as in claim 1,
   wherein the first pointers and the plurality of second pointers comprise qtrees.
8. The method as in claim 1,
   wherein the first pointers and the plurality of second pointers comprise a volume.
9. The method as in claim 1,
   wherein the first pointers and the plurality of second pointers comprise a sub-volume.
10. The method as in claim 1,
    wherein the first pointers and the plurality of second pointers comprise a sub-group in a volume.
11. The method as in claim 1, further comprising:
    wherein the first pointers and the plurality of second pointers comprise a sub-tree in a volume's file system.
12. The method as in claim 1, further comprising:
    wherein the first pointers and the plurality of second pointers comprise a volume sub-organization.
13. A method for operating a storage system, comprising:
    maintaining a root node having first pointers to a plurality of lower nodes, the lower nodes having reference through a plurality of second pointers to point to blocks of persistent storage, the blocks of persistent storage storing data of the storage system; and
    creating a persistent consistency point of the storage system at a selected time, the persistent consistency point created by creating a partial consistency point for one or more of the first pointers and second pointers to selected blocks of data.
14. The method of claim 13, further comprising:
    setting a status indicator to indicate that an identified partial consistency point is completed; and
    coalescing all partial consistency points into a final completed consistency point for the selected time after all of the partial consistency points reach a status of completed.
15. A method for operating a storage system, comprising:
    maintaining a root node having first pointers to a plurality of lower nodes, the lower nodes having reference through a plurality of second pointers to blocks of persistent storage storing data of the storage system;
    identifying a sub-organization of the pointers;
    creating a persistent consistency point of the storage system at a selected time, the persistent consistency point created by creating a partial consistency point for one or more of the sub-organizations of pointers;
    setting a status indicator to indicate that an identified partial consistency point is completed; and
    coalescing all partial consistency points into a final completed consistency point for the selected time after all of the partial consistency points reach a status of completed.
16. A storage system, comprising:
    a root node having first pointers to a plurality of lower nodes, the lower nodes having reference through a plurality of second pointers to point to blocks of persistent storage, the blocks of persistent storage storing data of the storage system;
    a persistent consistency point of the storage system created at a selected time, the persistent consistency point created by creating a partial consistency point for one or more of the first pointers and second pointers to selected blocks of data;
    a status indicator set to indicate that an identified partial consistency point is completed; and
    an operating system to coalesce all partial consistency points into a final completed consistency point for the selected time after all of the partial consistency points reach a status of completed.
17. The storage system of claim 16, further comprising:
    the operating system to save the final completed consistency point in persistent storage on a computer system holding data stored in the storage system.

18. The storage system of claim 16, further comprising:
a network adapter to transfer data of the final completed consistency point over a computer network to a target computer; and
an operating system of the target computer to write the final completed consistency point in persistent storage.

19. The storage system of claim 16, further comprising:
the operating system to roll back a partial consistency point in response to a failure in transferring partial consistency point data to a persistent storage.

20. A storage system, comprising:
a root node having first pointers to a plurality of lower nodes, the lower nodes having reference through a plurality of second pointers to point to blocks of persistent storage, the blocks of persistent storage storing data of the storage system; and
an operating system to create a persistent consistency point of the storage system at a selected time, the persistent consistency point created by creating a partial consistency point for one or more of the first pointers and second pointers to selected blocks of data.

21. The storage system of claim 20, further comprising:
a status indicator to indicate that an identified partial consistency point is completed; and
the operating system to coalesce all partial consistency points into a final completed consistency point for the selected time after all of the partial consistency points reach a status of completed.

22. A computer readable media, comprising:
said computer readable media containing instructions for execution on a processor for the practice of a method of operating a storage system, the method having the steps of,
maintaining a root node having first pointers to a plurality of lower nodes, the lower nodes having reference through a plurality of second pointers to point to blocks of persistent storage, the blocks of persistent storage storing data of the storage system; and
creating a persistent consistency point of the storage system at a selected time, the persistent consistency point created by creating a partial consistency point for one or more of the first pointers and second pointers to selected blocks of data.

23. A method for operating a storage system, comprising:
maintaining a root node of a qtree comprising first pointers to a plurality of lower nodes, the lower nodes comprising a plurality of second pointers that point to blocks of persistent storage, the blocks of persistent storage storing data of the storage system;
creating a persistent consistency point of the storage system at a selected time, the persistent consistency point created by creating a partial consistency point for one or more of the first pointers and second pointers to selected blocks of data;
setting a status indicator to indicate that an identified partial consistency point is completed; and
coalescing all partial consistency points into a final completed consistency point for the selected time after all of the partial consistency points reach a completed status.

24. The method as in claim 23, further comprising:
saving the final completed consistency point in persistent storage by an operating system of a computer maintaining the storage system.

25. The method as in claim 23, further comprising:
transferring data of the final completed consistency point over a computer network to a target computer; and
saving the final completed consistency point in persistent storage by the target computer.

26. The method as in claim 23, further comprising:
rolling back a partial consistency point in response to a failure in transferring partial consistency point data to a persistent storage.

27. A method for operating a storage system, comprising:
maintaining a root node having one or more qtrees, the qtrees comprising one or more first pointers to a plurality of lower nodes, the lower nodes having reference through a plurality of second pointers to point to blocks of persistent storage, the blocks of persistent storage storing data of the storage system; and
creating a persistent consistency point of the storage system at a selected time, the persistent consistency point created by creating a partial consistency point for one or more of the qtrees to selected blocks of data.

28. The method of claim 27, further comprising:
setting a status indicator to indicate that an identified partial consistency point is completed; and
coalescing all partial consistency points into a final completed consistency point for the selected time after all of the partial consistency points reach a completed status.

29. A method for operating a storage system, comprising:
maintaining a root node having a qtree, the qtree comprising first pointers to a plurality of lower nodes, the lower nodes having reference through a plurality of second pointers to blocks of persistent storage storing data of the storage system;
identifying a sub-organization of the pointers;
creating a persistent consistency point of the storage system at a selected time, the persistent consistency point created by creating a partial consistency point for one or more of the sub-organizations of pointers;
setting a status indicator to indicate that an identified partial consistency point is completed; and
coalescing all partial consistency points into a final completed consistency point for the selected time after all of the partial consistency points reach a completed status.

30. A storage system, comprising:
a root node having a qtree, the qtree comprising first pointers to a plurality of lower nodes, the lower nodes having reference through a plurality of second pointers to point to blocks of persistent storage, the blocks of persistent storage storing data of the storage system;
a persistent consistency point of the storage system created at a selected time, the persistent consistency point created by creating a partial consistency point for one or more of the qtrees to selected blocks of data;
a status indicator set to indicate that an identified partial consistency point is completed; and
an operating system to coalesce all partial consistency points into a final completed consistency point for the selected time after all of the partial consistency points reach a completed status.

31. The storage system of claim 30, wherein the operating system is further configured to save the final completed consistency point in persistent storage on a computer system holding data stored in the storage system.

32. The storage system of claim 30, further comprising:
a network adapter adapted to transfer data of the final completed consistency point over a computer network to a target computer; and an operating system of the target computer configured to write the final completed consistency point in persistent storage.

33. The storage system of claim 30, the operating system further configured to roll back a partial consistency point in response to a failure in transferring partial consistency point data to a persistent storage.

34. A storage system, comprising:
a root node having a qtree, the qtree comprising first pointers to a plurality of lower nodes, the lower nodes having reference through a plurality of second pointers to point to blocks of persistent storage, the blocks of persistent storage storing data of the storage system; and
an operating system to create a persistent consistency point of the storage system at a selected time, the persistent consistency point created by creating a partial consistency point for one or more of the first pointers and second pointers to selected blocks of data.

35. The storage system of claim 34, further comprising:
a status indicator to indicate that an identified partial consistency point is completed; and
the operating system to coalesce all partial consistency points into a final completed consistency point for the selected time after all of the partial consistency points reach a status of completed.

36. A computer readable media, comprising:
said computer readable media containing instructions for execution on a processor for the practice of a method of operating a storage system, the method comprising the steps of,
maintaining a root node having a qtree, the qtree comprising first pointers to a plurality of lower nodes, the lower nodes having reference through a plurality of second pointers to point to blocks of persistent storage, the blocks of persistent storage storing data of the storage system; and
creating a persistent consistency point of the storage system at a selected time, the persistent consistency point created by creating a partial consistency point for one or more of the first pointers and second pointers to selected blocks of data.

* * * * *